United States Patent
Montero et al.

(10) Patent No.: US 10,067,834 B1
(45) Date of Patent: Sep. 4, 2018

(54) SYSTEMS AND METHODS FOR RESETTING ONE OR MORE SYSTEM COMPONENTS IN RESPONSE TO A WATCHDOG TIMER (WDT) EVENT

(71) Applicant: DELL PRODUCTS L.P., Round Rock, TX (US)

(72) Inventors: Adolfo S. Montero, Pflugerville, TX (US); Chin-Jui Liu, Luzhu (TW)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 15/726,119

(22) Filed: Oct. 5, 2017

(51) Int. Cl.
| | |
|---|---|
| G06F 11/14 | (2006.01) |
| G06F 9/44 | (2018.01) |
| G06F 12/02 | (2006.01) |
| G06F 11/16 | (2006.01) |
| G06F 9/4401 | (2018.01) |

(52) U.S. Cl.
CPC ........ G06F 11/1417 (2013.01); G06F 9/4406 (2013.01); G06F 11/1469 (2013.01); G06F 12/0246 (2013.01); G06F 9/4401 (2013.01); G06F 11/1666 (2013.01); G06F 2201/805 (2013.01)

(58) Field of Classification Search
CPC .............. G06F 11/1417; G06F 9/4406; G06F 12/0246; G06F 11/1469; G06F 2201/805; G06F 11/1666; G06F 9/4401
See application file for complete search history.

(56) References Cited

U.S. PATENT DOCUMENTS

| | | | | |
|---|---|---|---|---|
| 9,846,616 B2 * | 12/2017 | Grobelny | ................ | G06F 9/441 |
| 2009/0271660 A1 * | 10/2009 | Chin | .................... | G06F 11/0757 |
| | | | | 714/15 |
| 2011/0093741 A1 * | 4/2011 | Liang | .................. | G06F 11/1417 |
| | | | | 714/6.1 |
| 2012/0311384 A1 * | 12/2012 | Li | ........................ | G06F 11/2284 |
| | | | | 714/27 |
| 2013/0185549 A1 * | 7/2013 | Hu | ........................ | G06F 9/4401 |
| | | | | 713/2 |
| 2014/0006764 A1 * | 1/2014 | Swanson | ............... | G06F 9/4401 |
| | | | | 713/2 |
| 2015/0331754 A1 | 11/2015 | Grobelny | | |
| 2016/0328300 A1 | 11/2016 | Rahardjo et al. | | |
| 2017/0295506 A1 * | 10/2017 | Rucker | .................... | H04W 4/70 |
| 2018/0088958 A1 * | 3/2018 | Remis | .................... | G06F 9/4401 |

OTHER PUBLICATIONS

Intel, Interface Base Specification (for Client and Server Platforms), Enhanced Serial Peripheral Interface (eSPI), Rev. 1.0, Jan. 2016, 133 pgs.

* cited by examiner

*Primary Examiner* — Brandon J Miller
(74) *Attorney, Agent, or Firm* — Egan Peterman Enders Huston

(57) ABSTRACT

Embodiments of information handling systems and methods are provided herein for resetting one or more system components in response to a watchdog timer (WDT) event. More specifically, the present disclosure provides information handling systems and methods for handling WDT events that occur within information handling systems comprising enhanced Serial Peripheral Interface (eSPI) master and slave devices.

20 Claims, 5 Drawing Sheets

SYSTEMS AND METHODS FOR RESETTING ONE OR MORE SYSTEM COMPONENTS IN RESPONSE TO A WATCHDOG TIMER (WDT) EVENT

FIELD

This invention relates generally to systems, and more particularly, to systems and methods for resetting one or more system components in response to a watchdog timer (WDT) event.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) typically include a boot system such as, for example, a Basic Input/Output System (BIOS) that operates to perform hardware initialization during the boot process (power-on startup) and/or system reset, and to provide runtime services for operating systems and programs. For example, the BIOS may initialize and test the IHS hardware components, load an operating system from memory or storage device, and/or perform a variety of other BIOS actions known in the art during a boot process. The BIOS is implemented as non-volatile firmware, which is often stored in a Flash memory device or read only memory (ROM) device. Upon system start-up or restart, a boot loader or boot block is executed to access the BIOS firmware and execute the boot code. In addition to accessing the BIOS firmware, the boot block may access additional application firmware stored within the Flash memory or ROM device for configuring one or more IHS hardware components. In one example, the boot block may fetch application firmware stored within the Flash memory or ROM device for local storage and use within an embedded controller (EC) of the IHS.

A watchdog timer (WDT) is an electronic timer that may be used to detect and recover from information handling system malfunctions. In some cases, a watchdog timer may be initiated in response to an IHS boot process and may be used to determine whether the boot process has taken too long and should be restarted. For example, a watchdog timer may be configured to expire or "trip" after a time period that is indicative of a problem with the boot process. During normal operation, the information handling system may regularly reset the watchdog timer to prevent it from elapsing, tripping or timing out. If the watchdog timer expires (e.g., due to a hardware fault, program error, intentional hardware reset initiation, or time expiration), a time out signal may be generated, a WDT flag may be set, and the information handling system may be rebooted.

In some cases, a watchdog timer trip may cause a hardware reset equivalent to the system or system component coming out of a "cold boot." In some cases, a hardware reset may cause the boot block to be re-executed, so that the BIOS and EC application firmware may be re-fetched from the Flash memory or ROM device and locally stored and executed. In other cases, however, the hardware reset may not propagate correctly to all system components associated with the reset/reboot process, thereby preventing the boot block from fetching the necessary boot-strapping code and resulting in a hung system. A need, therefore, exists for an improved information handling system and method for restarting one or more system components after a watchdog timer event.

SUMMARY OF THE INVENTION

The following description of various embodiments of information handling systems and related methods is not to be construed in any way as limiting the subject matter of the appended claims.

According to various embodiments of the present disclosure, systems and methods are provided herein for resetting one or more information handling system components in response to a watchdog timer (WDT) event. More specifically, the present disclosure provides systems and methods for handling WDT events that occur within information handling systems comprising enhanced Serial Peripheral Interface (eSPI) master and slave devices. In one or more embodiments described herein, an information handling system may include a platform controller hub (PCH) operating as an eSPI master device and an embedded controller (EC) operating as an eSPI slave device. As described in more detail below, hardware and software components are provided within the information handling system for successfully resetting the PCH in response to a WDT event.

According to one embodiment, an information handling system may include a PCH, an EC having a plurality of input/output (I/O) pins, which are coupled via an eSPI bus to the PCH, and a WDT configured to expire after a period of time. In one example, the WDT may expire if a problem occurs during execution of application firmware within the EC. Upon expiration of the WDT, the I/O pins of the EC may be tri-stated in an undefined logic state, and the EC may be configured to supply a first signal (e.g., a PWROK signal) via a first one of the I/O pins and a second signal (e.g., a RSMRST# signal) via a second one of the I/O pins to the PCH to initiate the process of resetting the PCH. In order to successfully reset the PCH, the first and second signals are preferably pulled down from the undefined logic state to a logic low state while an operating voltage (e.g., PRI-M_RAILS) is supplied to the PCH. In doing so, the system may ensure that a defined signal level is present on the first and second I/O pins before the PCH is reset.

In one embodiment, the information handling system may include a first resistor and a second resistor for pulling the first and second signals down to the logic low state. The first resistor may be coupled between the first one of the I/O pins and ground to pull the first signal down from the undefined logic state to the logic low state. The second resistor may be coupled between the second one of the I/O pins and ground to pull the second signal down from the undefined logic state to the logic low state.

In one embodiment, an information handling system may include a power controller, which is coupled to receive a third signal (e.g., a SLP_SUS# signal) from the PCH, control the operating voltage supplied to the PCH based on the third signal, and supply a fourth signal (e.g., a PRIM_PWRGD signal) to the EC in a logic high state when the operating voltage is at a desired voltage level. After the WDT expires and the first and second signals are pulled down to the logic low state, the operating voltage supplied to the PCH may be reduced below the desired voltage level, and the power controller may transition the fourth signal to the logic low state to indicate that the operating voltage is insufficient to power the PCH.

In one embodiment, the EC may be configured to transition the first signal (e.g., the PWROK signal) from the logic low state to a logic high state after the first signal is supplied to the PCH in the logic low state for a predetermined amount of time. After the first signal transitions to the logic high state, the operating voltage supplied to the PCH may be increased to the desired voltage level, and the power controller may transition the fourth signal (e.g., the PRIM_PWRGD signal) to the logic high state to indicate that the operating voltage is at the desired voltage level. After the power controller transitions the fourth signal to the logic high state, the EC may be configured to transition the second signal (e.g., the RSMRST# signal) from the logic low state to the logic high state to release the PCH from reset.

According to another embodiment, a method is provided herein for resetting a platform controller hub (PCH) in response to a watchdog timer (WDT) event that occurs within an embedded controller (EC) coupled to the PCH. In some cases, the method includes tri-stating a plurality of I/O pins of the EC in an undefined logic state in response to a WDT event. Next, the method may include supplying, from the EC, a first signal (e.g., a PWROK signal) via a first one of the I/O pins and a second signal (e.g., a RSMRST# signal) via a second one of the I/O pins to the PCH, and pulling the first and second signals down from the undefined logic state to a logic low state while an operating voltage (e.g., PRIM_RAILS) is supplied to the PCH at a desired voltage level. In doing so, the method may ensure that a defined signal level is present on the first and second I/O pins before the PCH is reset.

After the first and second signals supplied to the PCH are pulled down from the undefined logic state to the logic low state, the method may further include receiving a third signal (e.g., a SLP_SUS# signal) from the PCH, where the third signal is received by a power controller coupled between the PCH and the EC. In response to receiving the third signal, the method may further include reducing the operating voltage supplied to the PCH to reset the PCH, and providing a fourth signal (e.g., a PRIM_PWRGD signal) via the power controller to the EC in the logic low state to indicate that the operating voltage supplied to the PCH is not sufficient to power the PCH. After the first signal (e.g., the PWROK signal) is supplied in the logic low state for a first predetermined amount of time, the method may transition the first signal from the logic low state to a logic high state. In one embodiment, the first predetermined amount of time (e.g., t1=120 ms) may be selected to meet power sequencing timing requirements specified for the PCH.

After the first signal (e.g., the PWROK signal) transitions to the logic high state, the method may further include increasing the operating voltage supplied to the PCH to the desired voltage level, and transitioning the fourth signal (e.g., the PRIM_PWRGD signal) to the logic high state to indicate that the operating voltage supplied to the PCH is at the desired voltage level. After the first signal transitions to the logic high state, the method may wait a second predetermined amount of time (e.g., t2=95 ms) before increasing the operating voltage supplied to the PCH, and may wait up to a third predetermined amount of time (e.g., t3≤30 seconds) before transitioning the third signal to the logic high state. In one embodiment, the second and third predetermined amounts of time may be selected, for example, to ensure that the operating voltage has sufficient time to reach the desired voltage level and/or to meet power sequencing timing requirements specified for the PCH.

After the fourth signal transitions to the logic high state, the method may transition the second signal (e.g., the RSMRST# signal) from the logic low state to the logic high state to release the PCH from reset. In one embodiment, the method may wait a fourth predetermined amount of time (e.g., t4=35 ms) before transitioning the second signal to a logic high state to release the PCH from reset. The fourth predetermined amount of time may be selected, for example, to meet power sequencing timing requirements specified for the PCH.

According to another embodiment, an information handling system may include a PCH, a shared memory device coupled to the PCH via a Serial Peripheral Interface (SPI) bus, and an EC coupled to the PCH via an enhanced Serial Peripheral Interface (eSPI) bus. In this embodiment, the EC may include a plurality of I/O pins coupled to the PCH via the eSPI bus, a processing device and a watch dog timer (WDT). The processing device may be configured to execute a first set of program instructions (e.g., a boot block) to fetch a second set of program instructions (e.g., EC application firmware) from the shared memory device. The EC may further include a read only memory (ROM) for storing the first set of program instructions, and a random access memory (RAM) for storing the second set of program instructions after the second set is fetched from the shared memory device.

In the current embodiment, the processing device may execute the second set of program instructions, and the watch dog timer may be configured to expire after a predetermined time period if a problem occurs during execution of the second set of program instructions. If the WDT expires, the I/O pins of the EC may be tri-stated in an undefined logic state, and the EC may be configured to supply a first signal (e.g., a PWROK signal) via a first one of the I/O pins and a second signal (e.g., a RSMRST# signal) via a second one of the I/O pins to the PCH to initiate the process of resetting the PCH. In order to successfully reset the PCH, the first and second signals may be pulled down from the undefined logic state to a logic low state while an operating voltage (e.g., PRIM_RAILS) is supplied to the PCH at a desired voltage. In doing so, the system may ensure that a defined signal level is present on the first and second I/O pins before the PCH is reset.

In one embodiment, the information handling system may include a first resistor and a second resistor for pulling the first and second signals down to the logic low state. The first resistor may be coupled between the first one of the I/O pins and ground to pull the first signal (e.g., the PWROK signal) down from the undefined logic state to the logic low state. The second resistor may be coupled between the second one of the I/O pins and ground to pull the second signal (e.g., the RSMRST# signal) down from the undefined logic state to the logic low state.

In one embodiment, information handling system may include a power controller, which is coupled to receive a third signal (e.g., a SLP_SUS# signal) from the PCH, control the operating voltage supplied to the PCH based on the third signal, and supply a fourth signal (e.g., a PRIM_P-WRGD signal) to the EC in a logic high state when the operating voltage is at a desired level. After the first and second signals are pulled down to the logic low state, the operating voltage supplied to the PCH may be reduced below the desired voltage level to reset the PCH, and the power controller may transition the fourth signal to the logic low state to indicate that the operating voltage supplied to the PCH is insufficient.

In one embodiment, the EC may be configured to transition the first signal (e.g., the PWROK signal) from the logic low state to a logic high state after the first signal is supplied to the PCH in the logic low state for a predetermined amount of time. After the first signal transitions to the logic high state, the operating voltage supplied to the PCH may be increased to the desired voltage level to restart the PCH, and the power controller may transition the fourth signal (e.g., the PRIM_PWRGD signal) to the logic high state to indicate that the operating voltage is at the desired voltage level. After the power controller transitions the fourth signal to the logic high state, the EC may be configured to transition the second signal (e.g., the RSMRST# signal) from the logic low state to the logic high state to release the PCH from reset.

BRIEF DESCRIPTION OF THE DRAWINGS

Other advantages of the present disclosure will become apparent upon reading the following detailed description and upon reference to the accompanying drawings in which.

Figure 1:
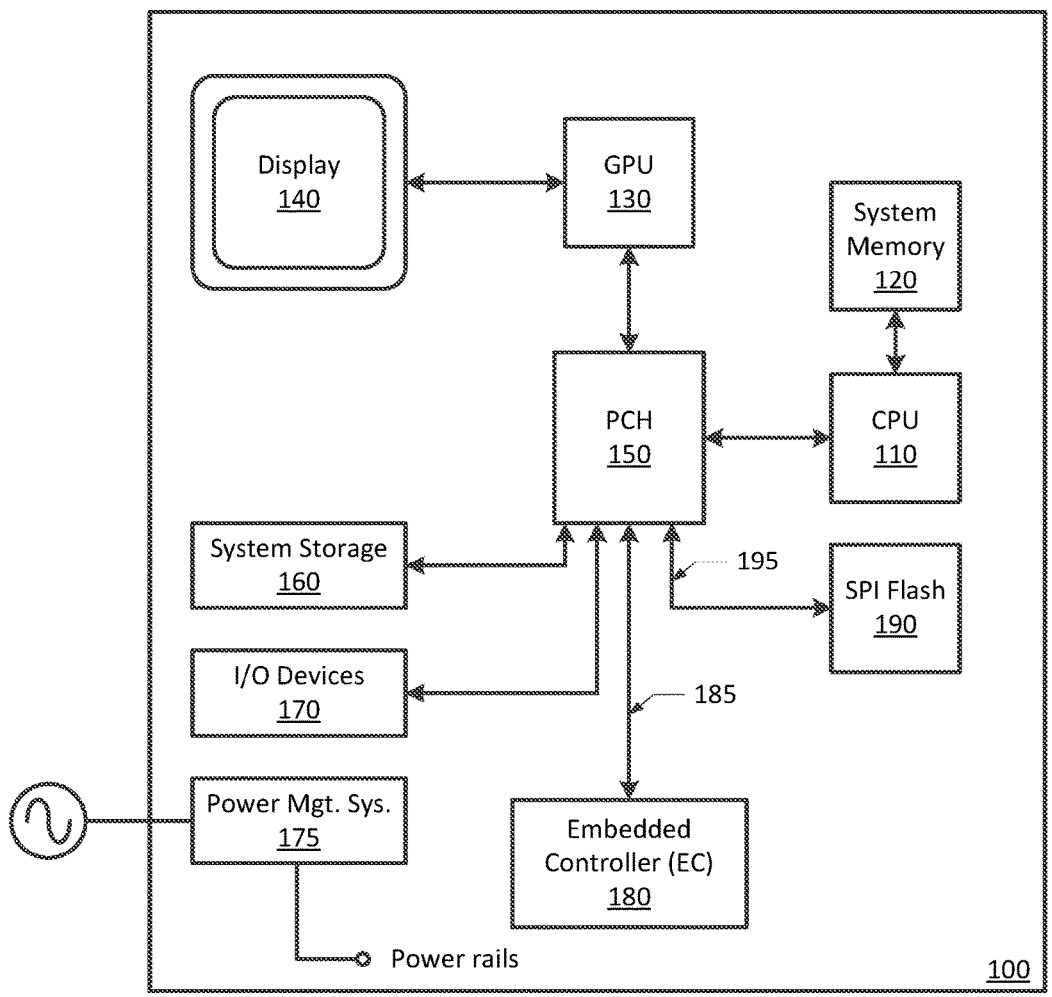
FIG. 1 is a block diagram illustrating one embodiment of an information handling system including a central processing unit (CPU), platform controller hub (PCH), embedded controller (EC) and shared Flash memory device.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

FIG. 1 is a block diagram of an information handling system 100 (e.g., a desktop computer, laptop computer, tablet computer, MP3 player, personal data assistant (PDA), cell phone, etc.) as it may be configured according to one embodiment of the present disclosure. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the present disclosure, the information handling system is not restricted to including only those components shown in FIG. 1 and described below.

As shown in FIG. 1, information handling system 100 may generally include one or more processing devices, such as a central processing unit (CPU) 110 for executing an operating system (OS) for system 100. CPU 110 may include any type of processing device, such as an Intel Pentium series processor, an Advanced Micro Devices (AMD) processor or another processing device. CPU 110 is coupled to system memory 120, which may include, for example, random access memory (RAM), read only memory (ROM), dynamic RAM (DRAM), synchronous DRAM (SDRAM), and other suitable storage mediums.

In some embodiments, information handling system 100 may include other types of processing devices including, but not limited to, a graphics processor unit (GPU) 130, a graphics-derivative processor (such as a physics/gaming processor), a digital signal processor (DSP), etc. Although GPU 130 is shown as a separate processing device in the embodiment of FIG. 1, GPU 130 may be omitted in other embodiments, when the functionality provided thereby is integrated within CPU 110 in a system-on-chip (SoC) design. In FIG. 1, display device 140 (e.g., LCD display or other suitable display device) is coupled to graphics processing unit (GPU) 130 to provide visual images (e.g., a graphical user interface, static images and/or video content) to the user. GPU 130 is, in turn, coupled to CPU 110 via platform controller hub 150.

Platform controller hub (PCH) 150 controls certain data paths and manages information flow between components of the information handling system. As such, PCH 150 may include one or more integrated controllers or interfaces for controlling the data paths connecting PCH 150 with CPU 110, GPU 130, system storage 160, input/output (I/O) devices 170, embedded controller (EC) 180 and SPI Flash memory device 190. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I²C) interface, a Universal Serial Bus (USB) interface and a Thunderbolt™ interface.

Local system storage 160 (e.g., one or more media drives, such as hard disk drives, optical drives, NVRAM, Flash memory, or any other suitable form of internal or external storage) is coupled to PCH 150 to provide permanent storage for information handling system 100. I/O devices 170 (e.g., a keyboard, mouse, touchpad, touchscreen, etc.) are coupled to PCH 150 to enable the user to interact with information handling system 100, and to interact with application programs or other software/firmware executing thereon.

Figure 3:
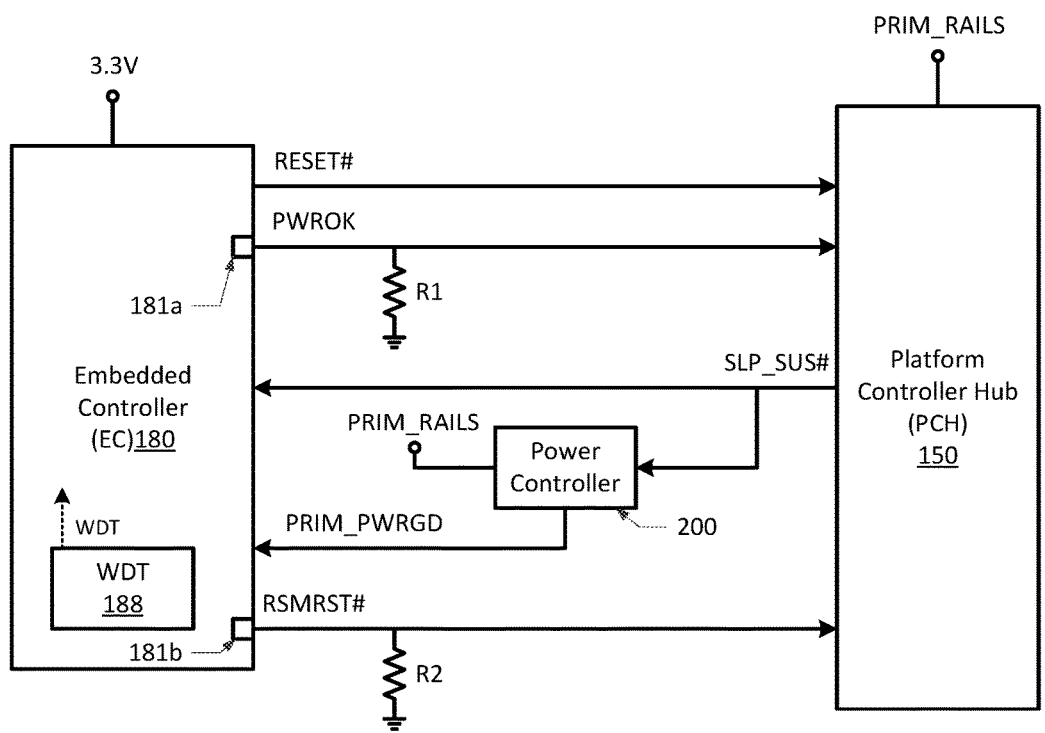
FIG. 3 a block diagram illustrating exemplary hardware and software components that provide the signal timing needed to restart the PCH after a WDT event occurs.

Information handling system 100 requires a power source to operate the various electronic components disposed therein. The power source can be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system. For example, power management system 175 may be coupled to provide an operating voltage on a primary power rail (e.g., PRIM_RAILS) to PCH 150, and may be further coupled to provide an operating voltage on a 3.3V power rail (e.g., 3.3V) to EC 180, as shown in the embodiment of FIG. 3. In addition to the power rails explicitly shown in FIG. 3, it is noted that power management system 175 may be coupled to provide additional operating voltages on one or more additional power rails to PCH 150, EC 180 and other components of information handling system 100.

Embedded controller (EC) 180 is coupled to PCH 150 and configured to boot the system BIOS and perform other functions such as power/thermal system management. According to one embodiment, EC 180 may be configured to execute program instructions to boot information handling system 100, load application firmware from SPI Flash memory device 190 into internal memory, and launch the application firmware, as described in more detail below. In one example, EC 180 may include a processing device 182 (see FIG. 2) for executing program instructions to perform the above stated functions. Although not strictly limited to such, processing device 182 may be implemented as a programmable integrated circuit (e.g., a controller, microcontroller, microprocessor, ASIC, etc., or as a programmable logic device "PLD" such as FPGA, complex programmable logic device "CPLD", etc.), in one embodiment.

As shown in FIG. 1, EC 180 is coupled PCH 150 via data bus 185, and SPI Flash memory device 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. As known in the art, SPI and eSPI are bus interfaces that operate in a master/slave mode of operation. eSPI is a bus interface that provides low voltage operation (1.8 V), lower pin count, and higher bandwidth (10-66 MHz) than other bus interfaces (such as LPC), and enable eSPI master and slave devices to access shared SPI devices, such as a shared Flash memory device. In the embodiment shown in FIG. 1, SPI Flash memory device 190 is a shared Flash memory device, which is connected to PCH 150 and EC 180 in a shared Master Attached Flash (MAF) configuration. In such a configuration, PCH 150 (i.e., an eSPI master) provides EC 180 (i.e., an eSPI slave) shared access to SPI Flash memory device 190 via eSPI bus 185, SPI bus 195 and various interface and logic blocks included within the PCH.

Figure 2:
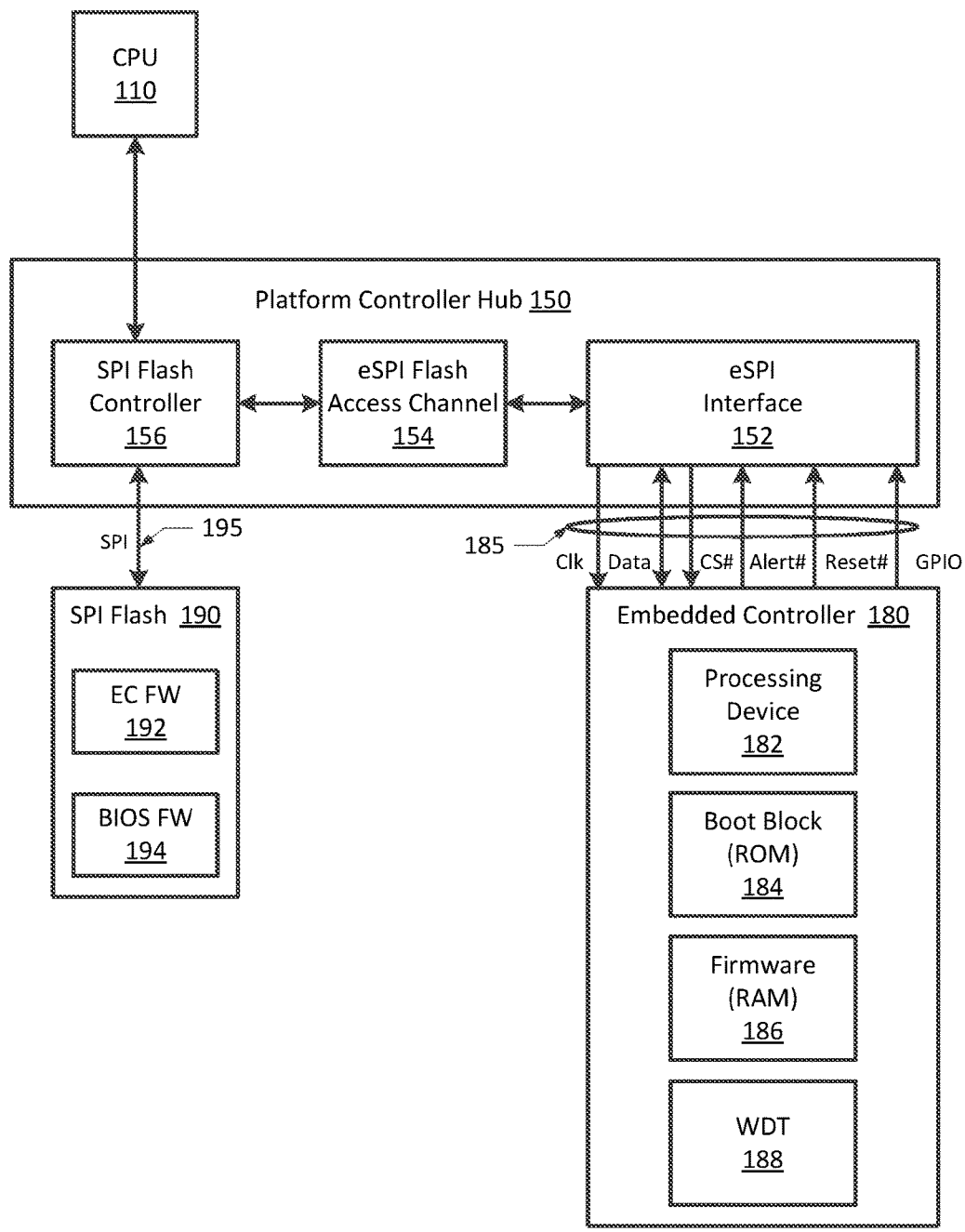
FIG. 2 is a block diagram of the CPU, PCH, EC and Flash memory device shown in FIG. 1.

FIG. 2 is a block diagram illustrating details of the CPU 110, PCH 150, EC 180 and SPI Flash memory device 190 shown in FIG. 1. As shown in FIG. 2, EC 180 is coupled to the eSPI interface 152 of PCH 150 via eSPI bus 185, and is provided access to the shared SPI Flash memory device 190 through eSPI Flash access channel 154, SPI Flash controller 156 and SPI bus 195. Likewise, CPU 110 is provided access to SPI Flash memory device 190 through SPI Flash controller 156 and SPI bus 195. As described in more detail below, SPI Flash controller 156 may access SPI Flash memory device 190 on behalf of EC 180 and CPU 110 to fetch the EC application firmware 192 and BIOS firmware 194 stored therein.

To fetch the EC application firmware 192 stored within the SPI Flash memory device 190, EC 180 sends a Flash read request over eSPI bus 185 to eSPI interface 152, which routes the request to eSPI Flash access channel 154 before the request is forwarded to SPI Flash controller 156. The SPI Flash controller 156 performs the Flash access on behalf of EC 180 over SPI bus 195. As described in more detail below, EC 180 may request Flash access to fetch the EC application firmware 192 from SPI Flash memory device 190 upon system power-on reset (e.g., upon AC insertion or power button press) and/or in response to a hardware reset (such as a watchdog timer event or another software time-out).

As shown in FIG. 2, EC 180 may generally include a processing device 182 for executing program instructions, a read only memory (ROM) for storing a boot block 184, a random access memory (RAM) for storing a local copy of EC application firmware 186, and a watchdog timer (WDT) 188 for monitoring processes and detecting malfunctions within the EC. At system power-on reset (e.g., upon AC insertion or power button press) and/or in response to a hardware reset (such as a watchdog timer event or another software time-out), processing device 182 may execute a first set of program instructions contained within boot block 184 (i.e., boot code) to fetch the EC application firmware 192 from the shared SPI Flash memory device 190. Once fetched, a local copy of the EC application firmware may be stored within RAM 186 and executed by processing device 182. When the power rails supplied to PCH 150 and CPU 110 reach desired voltage levels, CPU 110 may fetch BIOS firmware 194 from SPI Flash memory device 190, and execute the BIOS firmware to boot an operating system for information handling system 100. As noted above, SPI Flash controller 156 performs the Flash access on behalf of CPU 110 over SPI bus 195.

In order to access SPI Flash memory device 190, EC 180 may communicate a variety of signals across eSPI bus 185 to the eSPI interface 152 of PCH 150. As shown in FIG. 2, for example, EC 180 (i.e., an eSPI slave) and PCH 150 (i.e., an eSPI master) may each include a plurality of input/output (I/O) pins for communicating signals across the eSPI bus 185. In the illustrated embodiment, EC 180 includes a clock (Clk) pin, one or more data pins (Data[n:0], where n is 1 or 3 depending on I/O mode), a Chip Select# (CS#) pin, an Alert# pin, and a Reset# pin. Likewise, PCH 150 includes a clock (Clk) pin, one or more data pins (Data[n:0], where n is 1 or 3 depending on I/O mode), a dedicated Chip Select# (CS#) pin for each eSPI slave, an Alert# pin, and two Reset# pins (one for master-to-slave reset and one for slave-to-master reset). As used herein, "#" is appended on the end of a signal or pin designation to indicate that the signal/pin is asserted or active in a logic low state, whereas lack of "#" indicates that the signal/pin is asserted or active in a logic high state.

For eSPI master and slave devices, the clock pins provide reference timing for all serial input and output operations, the data pins provide bi-directional data transfer between eSPI master and slave(s), the Chip Select# pins are used to select a particular eSPI slave for communication, the Alert# pin is used by an eSPI slave to request service from an eSPI master, and the Reset# pin is used to reset the eSPI interface 152 for both master and slaves. In addition to the eSPI pins (i.e., the clock, data, CS#, Alert# and Reset# pins), EC 180 and PCH 150 may also include a number of general purpose I/O (GPIO) pins that can be used to communicate other signals between the eSPI master and slave devices.

According to the eSPI specification, an eSPI master dictates the flow of command and data between itself and the connected eSPI slaves by controlling the CS# pins for each of the eSPI slave(s). The eSPI master ensures that only one of the CS# pins is asserted (i.e., logic low) at any given time, thus allowing communication to flow between the eSPI master and the eSPI slave associated with that CS# pin. When the CS# pin is de-asserted (i.e., in a logic high state indicating that the eSPI slave is not selected for communication), or when the CS# pin is asserted (i.e., in the logic low state indicating that the eSPI slave is selected for communication) but the RESET# pin is asserted (i.e., in the logic low state to reset the eSPI slave), all pins of the eSPI slave are tri-stated (i.e., the pins are left "floating" and have no defined signal level) by default in the eSPI specification.

At system power-on reset (i.e., upon AC insertion or power button press), the Reset# pin, which is initially asserted in a logic low state, is de-asserted (e.g., transitioned to a logic high state) to begin a boot process for the information handling system. As used herein, a "boot process" is a process or set of operations performed by an information handling system component (e.g., a CPU, embedded controller or other processing device) to load system software and prepare the system for OS booting. An exemplary boot process performed by EC 180 at system power-on reset is described in more detail below. Such a boot process may be referred to as a "cold boot" when the information handling system is booted from a mechanical off (G3) state, or soft off (G2) state.

When the Reset# pin is de-asserted to a logic high state, processing device 182 of EC 180 begins executing the first set of program instructions contained within boot block 184 to start the boot process as soon as a signal supplied to EC 180 indicates that the power rails (e.g., 3.3V) supplied to the EC are sufficiently powered. In some cases, the boot process may begin by testing a logic state on the CS# pin of EC 180. If the CS# pin remains logic low for a minimum time period (e.g., 5 ms), the eSPI Flash Access Channel 154 is selected as the source for accessing the EC application firmware 192 from the shared SPI Flash memory device 190.

When the eSPI Flash Access Channel 154 is selected, processing device 182 configures certain I/O pins (e.g., the Clock, Data, CS#, Alert# and Reset# pins) of EC 180 for eSPI, enables the eSPI interface 152 within PCH 150, and sends a Flash read request to eSPI interface 152 to fetch the EC application firmware 192 from SPI Flash memory device 190. Once fetched, a copy of the EC application firmware 194 is stored locally in RAM 186 of EC 180. Once execution of the boot code contained within boot block 184 is finished, and the EC application firmware is loaded, processing device 182 may drive the CS# pin to a logic high state before executing the locally stored copy of the EC application firmware and entering a normal mode of operation. If the RESET# signal is re-asserted in a logic low state before the boot process completes, EC 180 may force a hardware reset to reset the eSPI interface 152 within PCH 150.

A watchdog timer (WDT) is an electronic timer that may be used to detect and recover from information handling system malfunctions. In one example, EC 180 may use WDT 188 to determine if the local copy of the EC application firmware stored within RAM 186 has stopped operating correctly. In such an example, WDT 188 may be configured to expire or "trip" after a predetermined time period (e.g., up to about 4 seconds) that indicates a problem has occurred with the firmware execution. If WDT 188 expires, a time out signal may be generated, and a WDT flag may be set to indicate that a WDT event has occurred. In some cases, EC 180 may initiate a hardware reset and restart the boot process in response to a WDT event.

Although an internal WDT 188 is included within EC 180 to monitor and detect problems with the EC application firmware execution, it is noted that other watchdog timers may be used by EC 180 and/or other system components to detect and recover from system malfunctions. In one example, EC 180 may use an external watchdog timer IC to detect problems with the EC application firmware execution. Although different corrective actions could be performed in response to a WDT event, the present disclosure is primarily concerned with WDT events that result in a hardware reset; and more specifically, a hardware reset of eSPI master and slave devices, such as PCH 150 and EC 180.

When WDT 188 (or an external WDT IC) indicates that a WDT event has occurred, EC 180 may initiate a hardware reset process to reset the eSPI interface 152 within PCH 150. In an ideal system, a hardware reset would trigger PCH 150 to re-fetch the EC application firmware 192 from SPI Flash memory device 190 on behalf of the EC, so that a local copy of the EC application firmware can be restored in RAM 186. In some systems, however, the hardware reset may not successfully reset the eSPI interface 152 within PCH 150. Without successfully resetting eSPI interface 152, PCH 150 cannot access the EC application firmware 192 stored within the shared SPI Flash memory device 190, and may be left in an undefined state and/or an endless reboot cycle if EC 180 continuously attempts to reset the eSPI interface 152.

Figure 4:
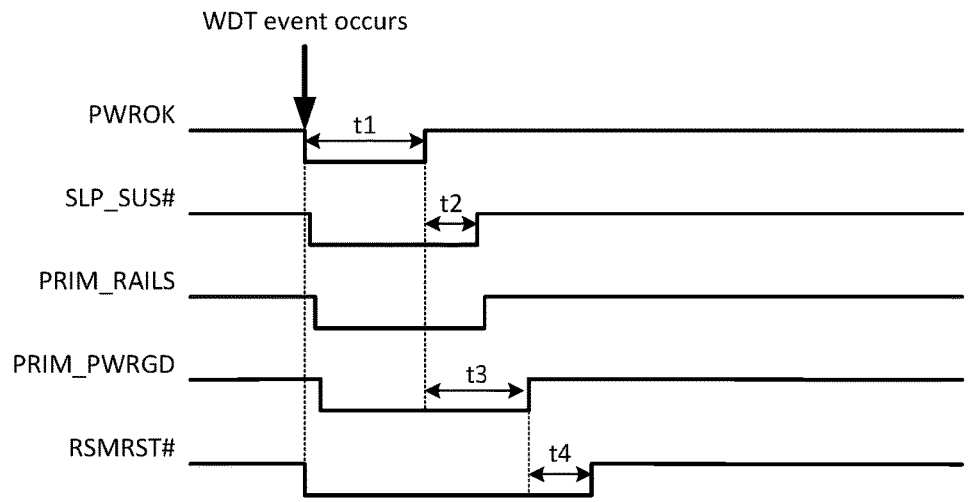
FIG. 4 is a timing diagram illustrating a sequence of signals that may be used to restart the PCH after a WDT event occurs.
Figure 5:
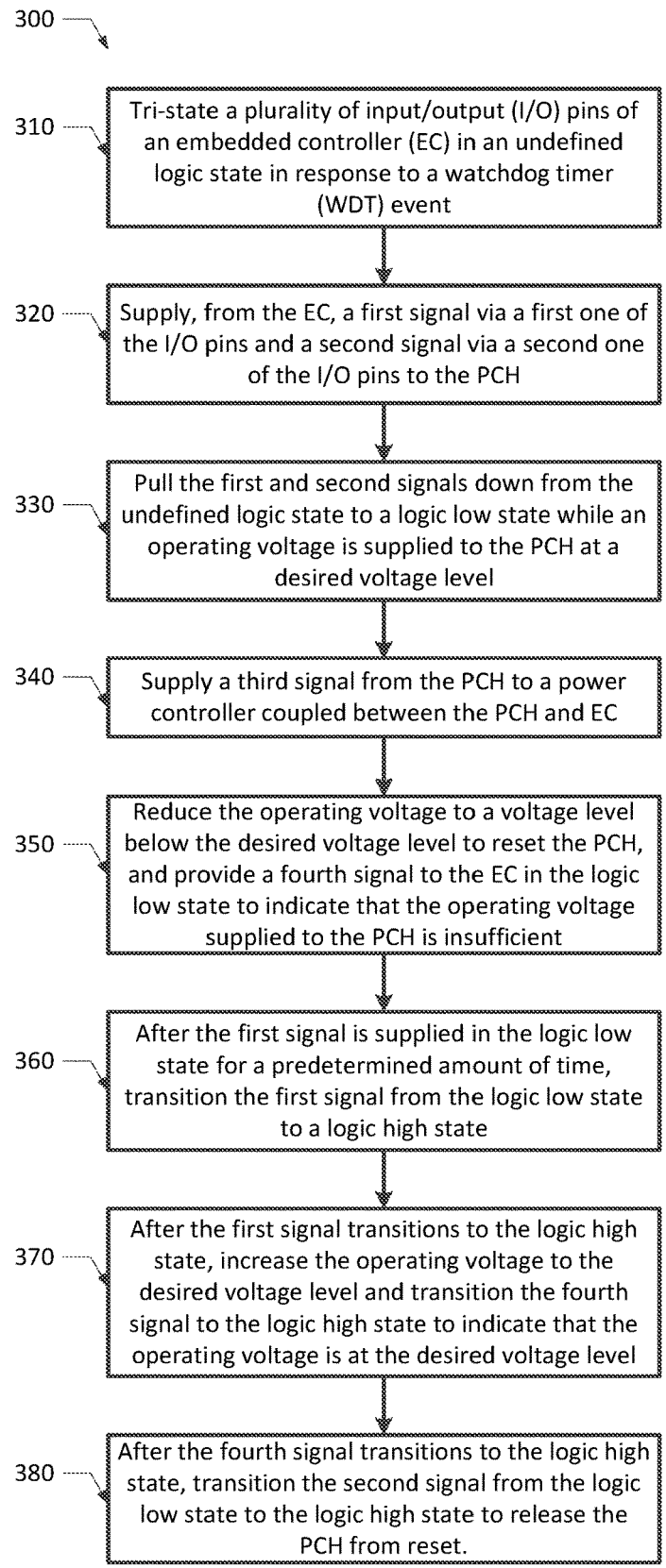
FIG. 5 is a flow chart diagram illustrating one embodiment of a method that may be performed to restart the PCH after a WDT event occurs.

FIG. 3 is a block diagram illustrating exemplary hardware and software components that may be used to successfully reset the eSPI interface 152 within PCH 150 after a WDT event occurs. FIG. 4 is a timing diagram illustrating a sequence of signals that may be used to reset PCH 150 after a WDT event occurs. FIG. 5 is a flow chart diagram illustrating one embodiment of a method 300 that may be performed to reset PCH 150 after a WDT event occurs.

In the discussion below, it is presumed that a WDT event occurs after the system has been powered, the RESET# signal has been de-asserted (e.g., to a logic high state to release EC 180 from reset) and the EC has begun executing the locally stored copy of EC application firmware. As noted above, EC 180 may use an internal WDT 188 (as shown in FIGS. 2 and 3), or an external WDT IC coupled to the EC (not shown), to detect problems with the EC application firmware execution. If a WDT event occurs due to a problem with the EC application firmware, EC 180 immediately tri-states its GPIO pins (i.e., leaves the pins floating in an undefined logic state). While the GPIO pins are tri-stated, EC 180 sends a Flash read request to PCH 150 to re-fetch the EC application firmware 192 from the shared SPI Flash memory device 190, stores a local copy of the EC application firmware is stored in RAM 186, and reinitializes the GPIO pins.

In order to successfully reset the eSPI interface 152 within PCH 150 in response to a WDT event that occurs due to a problem with the EC application firmware, EC 180 may supply a first signal (e.g., a PWROK signal) via a first one of the GPIO pins and a second signal (e.g., a RSMRST# signal) via a second one of the GPIO pins to PCH 150. As shown in FIG. 4, however, the first and second signals may be at or near a logic high level when EC 180 tri-states its GPIO pins in response to a WDT event. As described in more detail below, circuitry is provided herein to pull the first and second signals down from the floating, undefined logic state to a defined logic low state while an operating voltage (e.g., PRIM_RAILS) supplied to PCH 150 remains at a desired voltage level (e.g., a voltage level sufficient to power the PCH). This ensures that a defined signal level is present on the first and second GPIO pins before the operating voltage supplied to the PCH is reduced below the desired voltage level to reset the PCH.

Referring now to FIGS. 3, 4 and 5, EC 180 may begin the process of resetting the eSPI interface 152 within PCH 150 by tri-stating its GPIO pins in response to a WDT event (in step 310 of FIG. 5). After re-fetching the EC application firmware 192 from SPI Flash memory device 190, storing a local copy of the EC application firmware in RAM 186, and reinitializing the GPIO pins, EC 180 de-asserts the PWROK signal (e.g., a first signal) supplied to PCH 150 via a first one of the GPIO pins 181a, and asserts the RSMRST# signal (e.g., a second signal) supplied to the PCH via a second one of the GPIO pins 181b (in step 320 of FIG. 5).

As noted above, the PWROK and RSMRST# signals may be left floating at or near a logic high level when EC 180 tri-states the GPIO pins in response to a WDT event (in step 310). According to one embodiment, a first resistor (R1) may be coupled between the first GPIO pin 181a and ground, and a second resistor (R2) may be coupled between the second GPIO pin 181b and ground, to ensure that the PWROK and RSMRST# signals are pulled down from an undefined logic state to a defined logic low state while an operating voltage (e.g., PRIM_RAILS) is supplied to the PCH at a desired voltage level (in step 330 of FIG. 5). In one embodiment, relatively weak resistors pull-down R1 and R2 (e.g., approximately 10 kΩ to 100 kΩ) may be used to pull the PWROK and RSMRST# signals down to the defined logic low state.

After the PWROK and RSMRST# signals are pulled down to the logic low state, an asserted SLP_SUS# signal (e.g., a third signal asserted in a logic low state) is supplied from PCH 150 to EC 180 and power controller 200 (in step 340 of FIG. 5). In response to receiving the SLP_SUS# signal, power controller 200 instructs the power circuitry (e.g., power management system 175 of FIG. 1) to reduce the operating voltage supplied to the PCH on the PRIM_RAILS to a voltage level below the desired voltage level to reset the PCH (in step 350 of FIG. 5). In addition, power controller 200 supplies a PRIM_PWRGD signal (e.g., a fourth signal) to EC 180 in a logic low state to indicate that the operating voltage supplied to the PCH is insufficient (also in step 350 of FIG. 5).

As shown in the timing diagram of FIG. 4, EC 180 may supply the de-asserted, logic low PWROK signal to PCH 150 for a first predetermined amount of time (e.g., t1=120 ms) before asserting or transitioning the PWROK signal to a logic high state (in step 360 of FIG. 5). By asserting the PWROK signal, EC 180 informs PCH 150 that it can start its own internal power sequencing to begin bringing the PCH out of reset. The first predetermined amount of time may be selected, for example, to meet power sequencing timing requirements specified for the PCH.

After the PWROK signal transitions to the logic high state, the SLP_SUS# signal supplied to EC 180 and power controller 200 is de-asserted to a logic high state. In response, power controller 200 instructs the power circuitry (e.g., power management system 175 of FIG. 1) to increase the operating voltage supplied to PCH 150 on the PRIM_RAILS to the desired voltage level to reset the PCH (in step 370 of FIG. 5). According to one embodiment, the SLP_SUS# signal may be de-asserted to the logic high state, and the operating voltage supplied to the PCH may be increased, after the PWROK signal has been asserted in the logic high state for a second predetermined amount of time (e.g., t2=95 ms), as shown in FIG. 4. The second predetermined amount of time may be selected, for example, to ensure that the power circuitry has sufficient time to increase the operating voltage to the desired voltage level and/or to meet power sequencing timing requirements specified for the PCH.

After the PWROK signal is asserted in the logic high state, EC 180 monitors the state of the PRIM_PWRGD signal (i.e., the fourth signal) supplied to the EC by power controller 200. According to one embodiment, EC 180 may wait up to a third predetermined amount of time (e.g., t3≤30 seconds) for power controller 200 to transition the PRIM_PWRGD signal to the logic high state to indicate that the operating voltage supplied to the PCH on the PRIM_RAILS is at a desired voltage level (e.g., 1.8V). The third predetermined amount of time may be selected, for example, to meet power sequencing timing requirements specified for the PCH.

Once the PRIM_PWRGD signal transitions to the logic high state, EC 180 may wait a fourth predetermined amount of time (e.g., t4=35 ms) before de-asserting the RSMRST# signal (i.e., transitioning the RSMRST# signal to a logic high state) to release the PCH from reset (in step 380 of FIG. 5). The fourth predetermined amount of time may be selected, for example, to meet power sequencing timing requirements specified for the PCH. In addition to releasing PCH 150 from reset, the de-asserted RSMRST# signal enables CPU 110 to fetch BIOS firmware 194 from SPI Flash memory device 190, and execute the BIOS firmware to boot an operating system for information handling system 100.

In FIGS. 3-5, a combination of hardware and software components are used to successfully reset PCH 150 after a WDT event occurs by controlling the PWROK and RSMRST# signals supplied to the PCH by EC 180. For example, software residing within EC 180 (e.g., the EC application firmware) provides the signal timing needed to meet the timing requirements specified for the PCH to successfully reset PCH 150 after a WDT event occurs. In particular, the software ensures that the PWROK signal is de-asserted and the RSMRST# signal is asserted before the operating voltage (PRIM_RAILS) supplied to PCH 150 is reduced to reset the PCH. In addition, pull-down resistors R1 and R2 coupled to GPIO pins 181a and 181b ensure that the PWROK and RSMRST# signals are pulled down to a defined logic low state after the GPIO pins of the EC are tri-stated in response to a WDT event. Once the GPIO pins are re-initialized, the combination of hardware and software ensures that the PWROK and RSMRST# signals will have the defined signal levels needed to begin the process of resetting the PCH.

The software residing within EC 180 further ensures that PCH 150 isn't restarted until the PWROK signal is re-asserted (i.e., transitioned back to the logic high state), the operating voltage supplied to the PCH is increased to the desired voltage level and the RSMRST# signal is de-asserted to release the PCH from reset. As noted above, time delays (t1, t3 and t4) designated by the software for controlling the PWROK signal, operating voltage and RSMRST# signal ensure that power sequencing timing requirements specified for the PCH are met to successfully reset the PCH.

Figure 6:
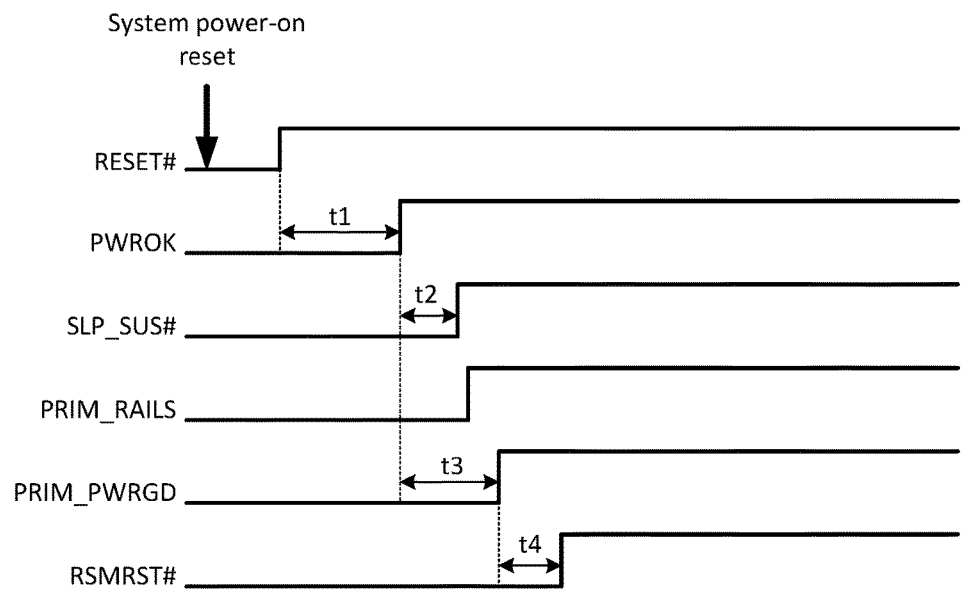
FIG. 6 is a timing diagram illustrating a sequence of signals that may be used to start the PCH at system power on reset.

The timing diagram shown in FIG. 6 shows that the same hardware and software components may be used to provide the signal timing needed to start PCH 150 at system power-on reset (i.e., upon AC insertion or power button press). When AC power is initially applied to the information handling system, the RESET#, PWROK, SLP_SUS#, PRIM_PWRGD, and RSMRST# signals are initially provided in a logic low state. As noted above, resistors R1 and R2 ensure that the PWROK and RSMRST# signals are pulled down to a defined low logic state before the operating voltage (PRIM_RAILS) is supplied to PCH 150. When the RESET# signal is asserted (i.e., in a logic low state), the GPIO pins of EC 180 are tri-stated, and the EC begins executing the program instructions stored within boot block 184. Once the RESET# signal is de-asserted (i.e., in a high low state), EC 180 sends a Flash read request over eSPI bus 185 to eSPI interface 152 to fetch the EC application firmware 192 from SPI Flash memory device 190. As noted above, eSPI interface 152 routes the request through eSPI Flash access channel 154 to SPI Flash controller 156, which performs the Flash access on behalf of EC 180 over SPI bus 195.

As shown in FIG. 6, EC 180 may wait a first predetermined amount of time (e.g., t1=120 ms) after the RESET# signal is de-asserted before asserting the PWROK signal in a logic high state. Once the PWROK signal is asserted, PCH 150 de-asserts the SLP_SUS# signal supplied to EC 180 and power controller 200 to a logic high state after a second predetermined time delay (e.g., t2=95 ms). In response, power controller 200 instructs the power circuitry (e.g., power management system 175 of FIG. 1) to increase the operating voltage supplied to the PCH on the PRIM_RAILS to power the PCH. When the PWROK signal is asserted, EC 180 monitors the state of the PRIM_PWRGD signal supplied by power controller 200, and may wait up to a third predetermined amount of time (e.g., t3≤30 seconds) for the PRIM_PWRGD signal to transition to the logic high state. Once the PRIM_PWRGD signal transitions to the logic high state, EC 180 waits a fourth predetermined amount of time (e.g., t4=35 ms) before de-asserting the RSMRST# signal (e.g., transitioning the RSMRST# signal to a logic high state) to release the PCH from reset.

As shown in FIGS. 4 and 6, different signal timings may be used to start or reset the PCH depending on whether the information handling system is powering up from a mechanical off state (G3) or coming up from a WDT initiated hardware reset. After EC 180 is released from reset, software residing within EC 180 (e.g., boot block 184) may test the WDT flag to determine if the EC is coming out of reset due to a regular power-on cycle or a watchdog initiated power on cycle. If the WDT flag is set, EC 180 may use the signal timing shown in FIG. 4 to reset the PCH after a WDT initiated hardware reset. Otherwise, EC 180 may use the signal timing shown in FIG. 6 to start the PCH in a regular power-on cycle.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will be understood that one or more of the tasks, functions, or methodologies described herein may be implemented, for example, as firmware or as a computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
a platform controller hub (PCH);
an embedded controller (EC) having a plurality of input/output (I/O) pins, which are coupled via an enhanced Serial Peripheral Interface (eSPI) bus to the PCH;
a watch dog timer (WDT) configured to expire after a period of time;
wherein the plurality of I/O pins are tri-stated in an undefined logic state upon expiration of the WDT; and
wherein upon expiration of the WDT, the EC is configured to supply a first signal via a first one of the I/O pins and a second signal via a second one of the I/O pins to the PCH, wherein the first and second signals supplied to the PCH are pulled down from the undefined logic state to a logic low state while an operating voltage is supplied to the PCH at a desired voltage level.

2. The information handling system as recited in claim 1, further comprising a first resistor and a second resistor, wherein:
the first resistor is coupled between the first one of the I/O pins and ground to pull the first signal down from the undefined logic state to the logic low state; and
the second resistor is coupled between the second one of the I/O pins and ground to pull the second signal down from the undefined logic state to the logic low state.

3. The information handling system as recited in claim 1, further comprising a power controller coupled to receive a third signal from the PCH, control the operating voltage supplied to the PCH based on the third signal, and supply a fourth signal to the EC in a logic high state when the operating voltage is at the desired voltage level.

4. The information handling system as recited in claim 3, wherein after the first and second signals are pulled down to the logic low state, the operating voltage supplied to the PCH is reduced below the desired voltage level to reset the PCH, and the power controller is configured to transition the fourth signal to the logic low state to indicate that the operating voltage is insufficient.

5. The information handling system as recited in claim 4, wherein after supplying the first signal to the PCH in the logic low state for a predetermined amount of time, the EC is configured to transition the first signal from the logic low state to a logic high state.

6. The information handling system as recited in claim 5, wherein after the first signal transitions to the logic high state, the operating voltage supplied to the PCH is increased to the desired voltage level, and the power controller is configured to transition the fourth signal to the logic high state to indicate that the operating voltage is at the desired voltage level.

7. The information handling system as recited in claim 6, wherein after the power controller transitions the fourth signal to the logic high state, the EC is configured to transition the second signal from the logic low state to the logic high state to release the PCH from reset.

8. A method for resetting a platform controller hub (PCH) in response to a watchdog timer (WDT) event that occurs within an embedded controller (EC) having a plurality of input/output (I/O) pins, which are coupled to the PCH via an enhanced Serial Peripheral Interface (eSPI) bus, the method comprising:
tri-stating the plurality of input/output (I/O) pins in an undefined logic state in response to a WDT event;
supplying, from the EC, a first signal via a first one of the I/O pins and a second signal via a second one of the I/O pins to the PCH; and
pulling, via a pair of resistors coupled to the first and second I/O pins, the first and second signals supplied to the PCH down from the undefined logic state to a logic low state while an operating voltage is supplied to the PCH at a desired voltage level.

9. The method as recited in claim 8, wherein after the step of pulling the first and second signals supplied to the PCH down from the undefined logic state to the logic low state, the method further comprises:
receiving a third signal from the PCH, the third signal received by a power controller coupled between the PCH and the EC;
reducing the operating voltage supplied to the PCH to a voltage level below the desired voltage level to reset the PCH; and (bringing the voltage down is not really what resets the PCH, the PCH is reset by the RSMRST# control signal)
providing, via the power controller, a fourth signal to the EC in the logic low state to indicate that the operating voltage supplied to the PCH is insufficient.

10. The method as recited in claim 9, wherein after the first signal is supplied in the logic low state for a predetermined amount of time, the method further comprises executing firmware within the EC to transition the first signal from the logic low state to a logic high state.

11. The method system as recited in claim 10, wherein after the first signal transitions to the logic high state, the method further comprises:
increasing the operating voltage supplied to the PCH to the desired voltage level; and
transitioning the fourth signal to the logic high state to indicate that the operating voltage supplied to the PCH is at the desired voltage level.

12. The method as recited in claim 11, wherein after the fourth signal transitions to the logic high state, the method further comprises executing firmware within the EC to transition the second signal from the logic low state to the logic high state to release the PCH from reset.

13. An information handling system, comprising:
a platform controller hub (PCH);
a shared memory device coupled to the PCH via a Serial Peripheral Interface (SPI) bus;
an embedded controller (EC) coupled to the PCH via an enhanced Serial Peripheral Interface (eSPI) bus, wherein the embedded controller comprises:
a plurality of input/output (I/O) pins coupled to the PCH via the eSPI bus;
a processing device configured to execute a first set of program instructions to fetch a second set of program instructions from the shared memory device, and further configured to execute the second set of program instructions; and
a watch dog timer (WDT) configured to expire after a predetermined time period if a problem occurs during execution of the second set of program instructions;
wherein if the WDT expires, the EC is configured to supply a first signal via a first one of the I/O pins and a second signal via a second one of the I/O pins to the PCH, wherein the first and second signals are pulled down from an undefined logic state to a logic low state while an operating voltage is supplied to the PCH at a desired voltage level.

14. The information handling system as recited in claim 13, wherein the EC further comprises:
read only memory (ROM) configured for storing the first set of program instructions; and
random access memory (RAM) configured for storing the second set of program instructions after the second set of program instructions is fetched from the shared memory device.

15. The information handling system as recited in claim 13, further comprising a first resistor and a second resistor, wherein:
the first resistor is coupled between the first one of the I/O pins and ground to pull the first signal down from the undefined logic state to the logic low state; and
the second resistor is coupled between the second one of the I/O pins and ground to pull the second signal down from the undefined logic state to the logic low state.

16. The information handling system as recited in claim 13, further comprising a power controller coupled to receive a third signal from the PCH, control the operating voltage supplied to the PCH based on the third signal, and supply a fourth signal to the EC in a logic high state when the operating voltage is at the desired voltage level.

17. The information handling system as recited in claim 16, wherein after the first and second signals are pulled down to the logic low state, the operating voltage supplied to the PCH is reduced below the desired voltage level to reset the PCH, and the power controller is configured to transition the fourth signal to the logic low state to indicate that the operating voltage is insufficient, (again lowering the operating voltage is not the main method to reset the PCH, lowering the voltage is a power savings event to keep the PCH in a lower power state).

18. The information handling system as recited in claim 17, wherein after the first signal is supplied to the PCH in the logic low state for a first predetermined amount of time, the EC is configured to transition the first signal from the logic low state to a logic high state.

19. The information handling system as recited in claim 18, wherein after the first signal transitions to the logic high state, the operating voltage supplied to the PCH is increased to the desired voltage level, and the power controller is configured to transition the fourth signal to the logic high state to indicate that the operating voltage supplied to the PCH is at the desired voltage level.

20. The information handling system as recited in claim 19, wherein after the power controller transitions the fourth signal to the logic high state, the EC is configured to transition the second signal from the logic low state to the logic high state to release the PCH from reset.

* * * * *